(12) United States Patent
Payne

(10) Patent No.: US 11,519,447 B1
(45) Date of Patent: Dec. 6, 2022

(54) TAMPER PROOF PLUG

(71) Applicant: Michael Payne, San Jose, CA (US)

(72) Inventor: Michael Payne, San Jose, CA (US)

( * ) Notice: Subject to any disclaimer, the term of this patent is extended or adjusted under 35 U.S.C. 154(b) by 491 days.

(21) Appl. No.: 16/797,138

(22) Filed: Feb. 21, 2020

(51) Int. Cl.
*F16B 23/00* (2006.01)
*F16B 41/00* (2006.01)
*F16K 35/00* (2006.01)

(52) U.S. Cl.
CPC ........ *F16B 23/0007* (2013.01); *F16B 41/005* (2013.01); *F16B 23/00* (2013.01); *F16K 35/00* (2013.01)

(58) Field of Classification Search
CPC .... F16B 23/00; F16B 23/003; F16B 23/0007; F16B 41/005; F16K 35/00; F16L 5/10; B25B 15/005; B60R 16/0215; Y10S 411/91; Y10S 411/919
USPC ........................ 411/402, 403; 16/2.1, 2.2, 2.4
See application file for complete search history.

(56) References Cited

U.S. PATENT DOCUMENTS

| | | | |
|---|---|---|---|
| 1,080,707 A * | 12/1913 | Mackie et al. .......... | E21B 21/01 91/348 |
| 1,753,154 A * | 4/1930 | Martus .................. | F16B 35/005 411/395 |
| 1,984,590 A | 12/1934 | Maddin | |
| D136,659 S * | 11/1943 | Janning et al. ................. | D9/439 |
| 2,397,216 A * | 3/1946 | Stellin .................. | F16B 23/0038 411/404 |
| 2,532,815 A * | 12/1950 | La Vern Kindsvatter ................... | F16B 35/005 188/69 |
| 2,678,801 A * | 5/1954 | Bradbury ................ | F16K 5/165 137/328 |
| 2,830,635 A * | 4/1958 | Thorstens ............. | F16B 39/286 411/929 |
| 2,907,245 A * | 10/1959 | Whitson ............... | F16B 35/005 411/393 |
| 3,144,293 A * | 8/1964 | De Smidt ................ | H01R 4/32 411/378 |
| 3,254,690 A * | 6/1966 | Neuschotz ............ | B25B 27/143 29/523 |
| 3,296,861 A * | 1/1967 | Mueller ................ | G01F 15/185 73/201 |
| 3,865,007 A * | 2/1975 | Stanback ............ | F16B 23/0007 439/814 |
| 3,963,322 A * | 6/1976 | Gryctko ................... | H01R 4/36 439/814 |
| 4,199,216 A * | 4/1980 | Gryctko ................... | H01R 4/36 439/814 |
| 5,019,080 A * | 5/1991 | Hemer ............... | A61B 17/8615 606/305 |
| 6,044,670 A | 4/2000 | Cituts et al. | |
| 7,409,843 B1 | 8/2008 | Rineheart, Sr. | |

(Continued)

*Primary Examiner* — Roberta S Delisle
(74) *Attorney, Agent, or Firm* — Kevin Roe

(57) ABSTRACT

A tamper proof plug comprising a circular plug of material having a first side and a second side, with a first plurality of threads on the outer circumference to enable the circular plug to screw into a second plurality of inner circumference threads of a valve outlet that can control the flow of a liquid, wherein the circular plug has a polygon indentation in the middle of the first side of the plug, which is accessible to a tool having a protrusion the fits the size and shape of the polygon indentation, that allows a torque to be applied to the circular plug to screw the circular plug into a valve or unscrew the circular plug from a valve.

6 Claims, 6 Drawing Sheets

(56) References Cited

U.S. PATENT DOCUMENTS

| | | |
|---|---|---|
| 7,797,972 B2 | 9/2010 | Nickeas et al. |
| 8,051,690 B2 | 11/2011 | Camisasca |
| 9,618,025 B2 * | 4/2017 | Yu ......................... F16B 35/045 |
| D787,025 S * | 5/2017 | Taylor .......................... D23/260 |
| 2009/0129888 A1* | 5/2009 | Hung ................... F16B 35/005 |
| | | 411/393 |
| 2011/0095150 A1* | 4/2011 | Geier ..................... F16M 13/02 |
| | | 248/220.22 |
| 2013/0011215 A1* | 1/2013 | Wells ................. F16B 23/0007 |
| | | 411/548 |

\* cited by examiner

TAMPER PROOF PLUG

BACKGROUND OF INVENTION

Field of the Invention

This invention relates to a tamper proof plug to inhibit unauthorized fluid withdrawals from valves.

Description of the Prior Art

A typical problem occurs when people try to tamper with valves and steal fluids, such as water or some other type of liquid chemical such as a liquid fuel. This tampering can not only result in the theft of large quantities of valuable fluid, but also possibly result in the contamination of the fluid, depending on the connection means used to steal the fluid. Various types of inventions have tried to stop the tampering with valves to steal fluids. The prior art has focused on various ways to physically lock up or block valves to prevent unauthorized access to fluids such as fuel or water. The prior art requires either special keys and locks, or requires special anti-siphoning blocks to prevent unauthorized access by siphoning fluid. Furthermore, the prior art has not really tried to hide the lock or block very well from visual inspection before the tampering is attempted.

In view of the prior art, an improved tamper proof plug is needed.

BRIEF DESCRIPTION OF THE DRAWINGS

Non-limiting and non-exhaustive embodiments of the invention are described with reference to the following figures.

DETAILED DESCRIPTION OF THE EMBODIMENTS

One embodiment of the present invention provides a tamper proof plug that uses one of various polygon shapes indented on one side of a circular plug that requires a matching tool that has a protrusion having the same size and shape to insert into the polygon shape indentation in one side of the plug. This matching tool, not commonly available to potential fluid thieves, would allow a torque to be applied to the plug. The circular plug would typically have threads on the outer circumference to engage threads of the same pitch on the inner circumference of a valve, to either screw in the circular plug into the valve to stop fluid flow, or unscrew the circular plug from the valve to allow fluid flow. Without the invention to prevent tampering and unauthorized access, the fluids most likely to be stolen are water or liquid fuels, such as gasoline, aircraft fuel, or diesel, but other liquid chemicals could also be accessed in large quantities for the purposes of theft, vandalism or terrorism.

In the embodiments illustrated in FIGS. 1 to 5, various embodiments of tamper proof plugs are shown. Each tamper proof plug can be fabricated from various metals or metal alloys, a ceramic or a rigid and strong polymer, more or less corrosion resistant to the fluid as needed. Various polygon shapes could be used, and the polygon shaped indentation on one side of the tamper proof plug could be fabricated by molding the tamper proof plug to have the indentation, or by routing out an indentation, or by stamping an indentation into the tamper proof plug during the fabrication of the tamper proof plug. The plug function requires that the indentation must not punch through the entire thickness of the plug. The pitch of the thread cut or molded into the tamper proof plug will be fabricated to match the thread pitch inside a fluid valve, such as a test cock of a backflow device used for water flow. In one embodiment, the tamper proof plug will be hidden entirely inside the valve.

Figure 1A:
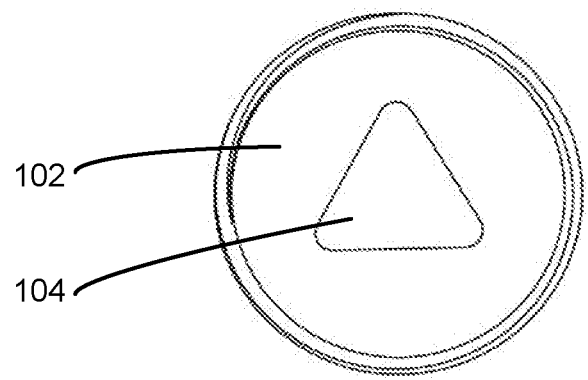
FIG. 1A illustrates a top down view of a tamper proof plug, in accordance with one embodiment of the prior art.
Figure 1B:
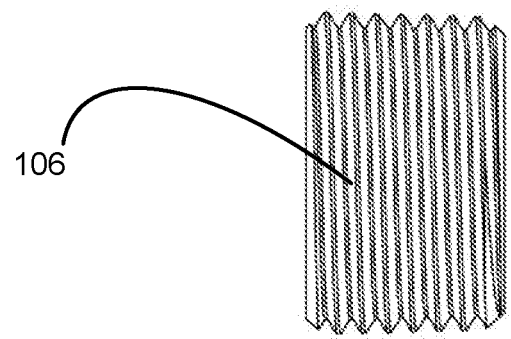
FIG. 1B illustrates a side view of a plurality of threads on the outer circumference of the tamper proof plug.
Figure 1C:
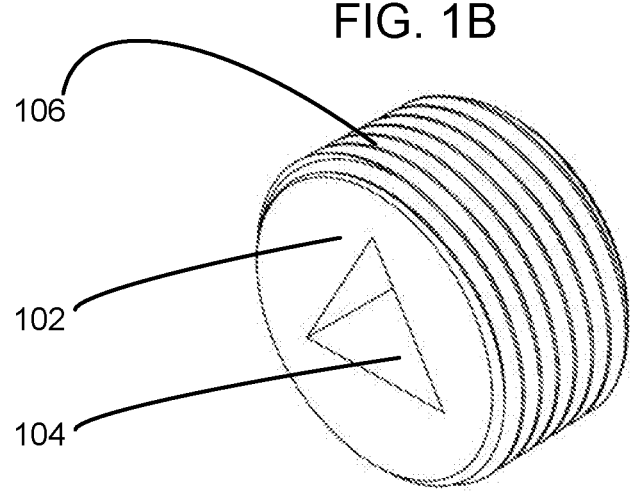
FIG. 1C illustrates a perspective view of the tamper proof plug.

FIG. 1A illustrates a top view of a tamper proof plug, in accordance with one embodiment of the invention. The tamper proof plug has a face 102 which has a trianglar indentation 104. FIG. 1B illustrates a side view of a tamper proof plug, in accordance with one embodiment of the invention. The threads 106 are shown on the circumference of the tamper proof plug. FIG. 1C illustrates a perspective view of a tamper proof plug, in accordance with one embodiment of the invention. The tamper proof plug face 102 has the trianglar shaped indentation 104 and the threads 106 on the circumference of the tamper proof plug. The tamper proof plug will screw inside a valve, such as a test cock of a backflow device to prevent water from being used. In one embodiment, it will sit inside the lip of the test cock, so that it won't be easily visible. In this embodiment, the plug will have a trianglar shape indented into the middle of one side of the plug. The plug can only be removed by a special tool (shown below in FIG. 6A, 6B, 6C) that has the same size of a trianglar shape protrusion, that will fit inside of the trianglar shape of the plug to allow a torque to be applied to the tamper proof plug to unscrew it to remove it or to screw it in to install it into a valve (not shown), as needed.

Figure 2A:
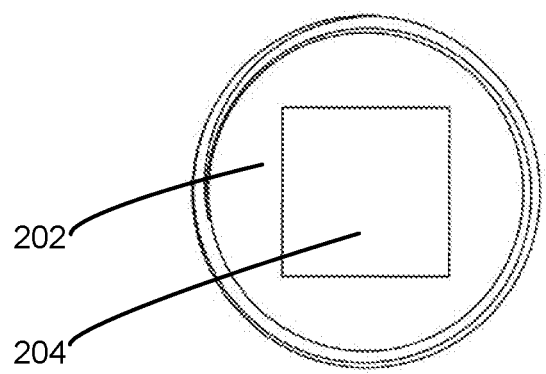
FIG. 2A illustrates a top down view of a tamper proof plug, in accordance with one embodiment of the prior art.
Figure 2B:
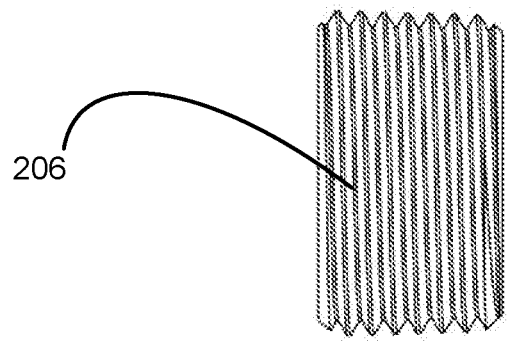
FIG. 2B illustrates a side view of a plurality of threads on the outer circumference of the tamper proof plug.
Figure 2C:
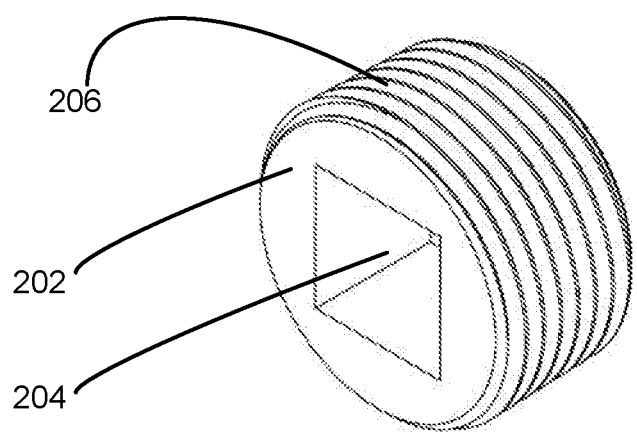
FIG. 2C illustrates a perspective view of the tamper proof plug.

FIG. 2A illustrates a top view of a tamper proof plug, in accordance with one embodiment of the invention. The tamper proof plug has a face 202 which has a square indentation 204. FIG. 2B illustrates a side view of a tamper proof plug, in accordance with one embodiment of the invention. The threads 206 are shown on the circumference of the tamper proof plug. FIG. 2C illustrates a perspective view of a tamper proof plug, in accordance with one embodiment of the invention. The tamper proof plug face 202 has the square shaped indentation 204 and the threads 206 on the circumference of the tamper proof plug. In this embodiment, the plug will have a square shape indented into the middle of one side of the plug. The plug can only be removed by a special tool that has the same size of a square shape protrusion, that will fit inside the square shape of the plug to allow a torque to be applied to the tamper proof plug to unscrew it to remove it or to screw it in to install it into a valve (not shown), as needed.

Figure 3A:
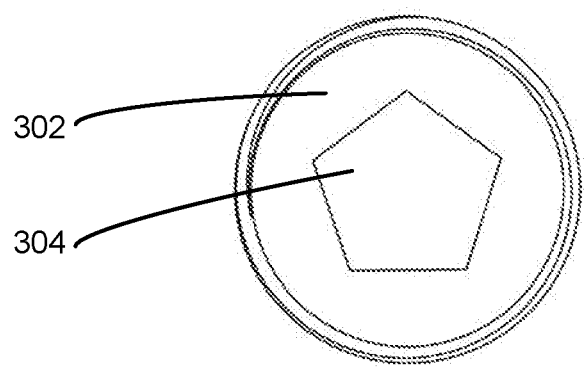
FIG. 3A illustrates a top down view of a tamper proof plug, in accordance with one embodiment of the prior art.
Figure 3B:
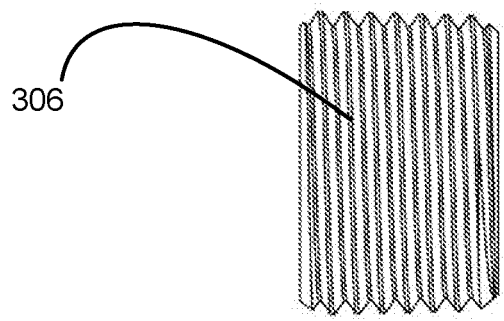
FIG. 3B illustrates a side view of a plurality of threads on the outer circumference of the tamper proof plug.
Figure 3C:
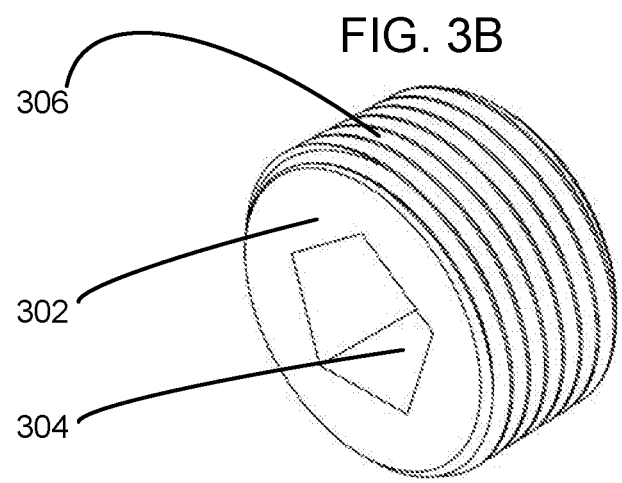
FIG. 3C illustrates a perspective view of the tamper proof plug.

FIG. 3A illustrates a top view of a tamper proof plug, in accordance with one embodiment of the invention. The tamper proof plug has a face 302 which has a pentagon indentation 304. FIG. 3B illustrates a side view of a tamper proof plug, in accordance with one embodiment of the invention. The threads 306 are shown on the circumference of the tamper proof plug. FIG. 3C illustrates a perspective view of a tamper proof plug, in accordance with one embodiment of the invention. The tamper proof plug face 302 has the pentagon shaped indentation 304 and the threads 306 on the circumference of the tamper proof plug. In this embodiment, the plug will have a pentagon shape indented into the middle of one side of the plug. The plug can only be removed by a special tool that has the same size of a pentagon shape protrusion, that will fit inside the pentagon shape on the plug to allow a torque to be applied to the tamper proof plug to unscrew it to remove it or to screw it in to install it into a valve (not shown), as needed.

Figure 4A:
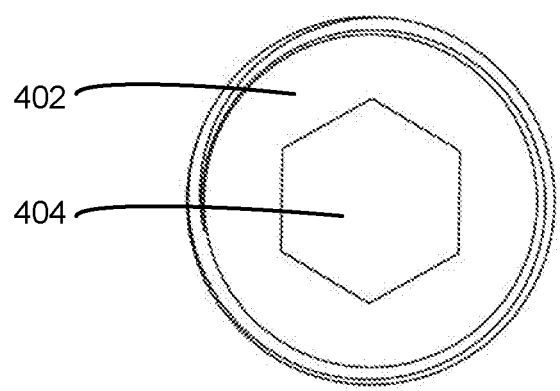
FIG. 4A illustrates a top down view of a tamper proof plug, in accordance with one embodiment of the prior art.
Figure 4B:
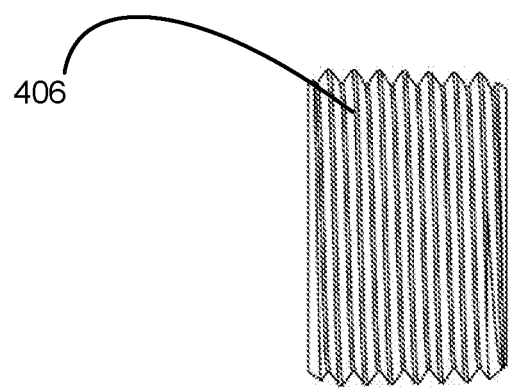
FIG. 4B illustrates a side view of a plurality of threads on the outer circumference of the tamper proof plug.
Figure 4C:
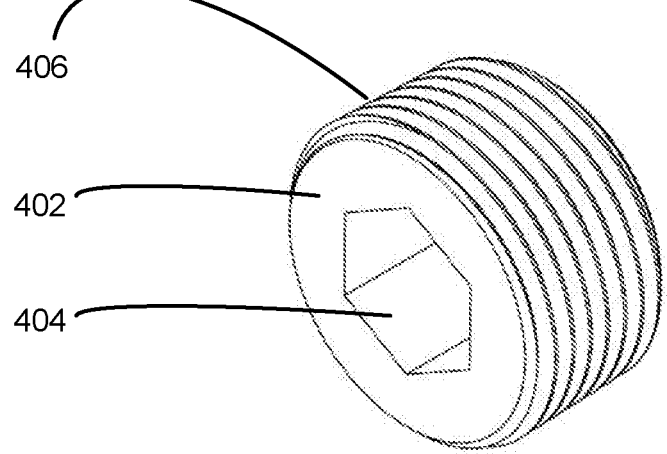
FIG. 4C illustrates a perspective view of the tamper proof plug.

FIG. 4A illustrates a top view of a tamper proof plug, in accordance with one embodiment of the invention. The tamper proof plug has a face 402 which has a hexagon indentation 404. FIG. 4B illustrates a side view of a tamper proof plug, in accordance with one embodiment of the invention. The threads 406 are shown on the circumference of the tamper proof plug. FIG. 4C illustrates a perspective view of a tamper proof plug, in accordance with one embodiment of the invention. The tamper proof plug face 402 has the hexagon shaped indentation 404 and the threads 406 on the circumference of the tamper proof plug. In this embodiment, the plug will have a hexagon shape indented into the middle of one side of the plug. The plug can only be removed by a special tool that has the same size of a hexagon shape protrusion, that will fit inside the hexagon shape of the plug to allow a torque to be applied to the tamper proof plug to unscrew it to remove it or to screw it in to install it into a valve (not shown), as needed. The size of the hexagon indentation could be designed to be unique and not be closely matched by any standard size of Allen wrench or other tool.

Figure 5A:
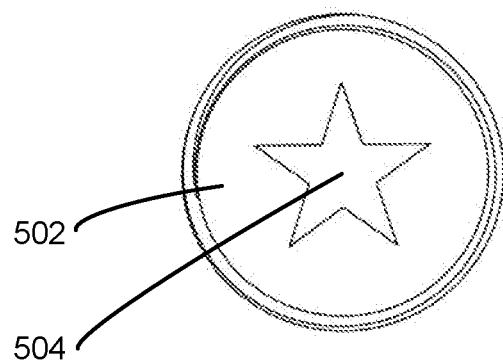
FIG. 5A illustrates a top down view of a tamper proof plug, in accordance with one embodiment of the prior art.
Figure 5B:
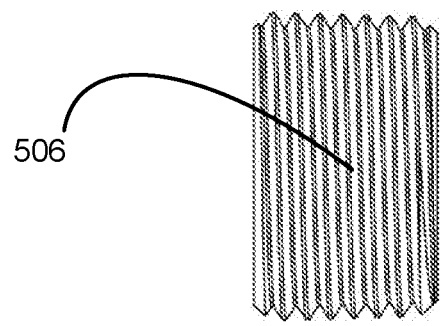
FIG. 5B illustrates a side view of a plurality of threads on the outer circumference of the tamper proof plug.
Figure 5C:
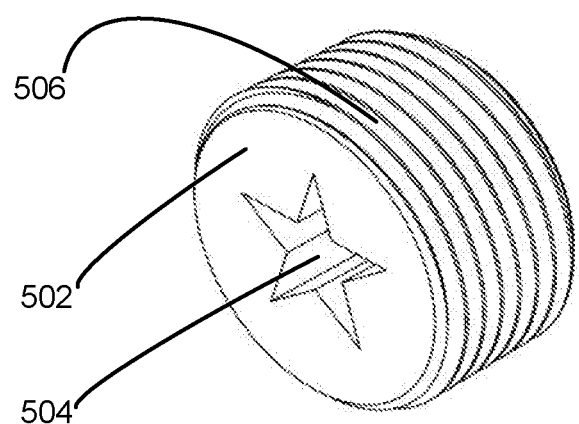
FIG. 5C illustrates a perspective view of the tamper proof plug.

FIG. 5A illustrates a top view of a tamper proof plug, in accordance with one embodiment of the invention. The tamper proof plug has a face 502 which has a star shaped indentation 504. FIG. 5B illustrates a side view of a tamper proof plug, in accordance with one embodiment of the invention. The threads 506 are shown on the circumference of the tamper proof plug. FIG. 5C illustrates a perspective view of a tamper proof plug, in accordance with one embodiment of the invention. The tamper proof plug face 502 has the star shaped indentation 504 and the threads 506 on the circumference of the tamper proof plug. In this embodiment, the plug will have a star shape indented into the middle of one side of the plug. The plug can only be removed by a special tool that has the same size of a star shape protrusion, that will fit inside the star shape of the plug to allow a torque to be applied to the tamper proof plug to unscrew it to remove it or to screw it in to install it into a valve (not shown), as needed.

Figure 6A:
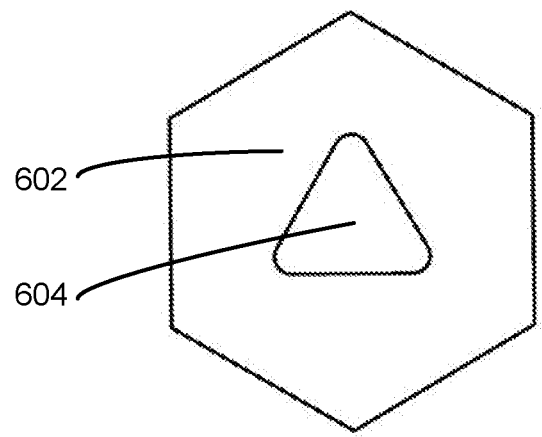
FIG. 6A illustrates a top down view of a tool to screw or unscrew a tamper proof plug as shown in FIGS. 1A, 1B, and 1C, in accordance with one embodiment of the prior art.
Figure 6B:
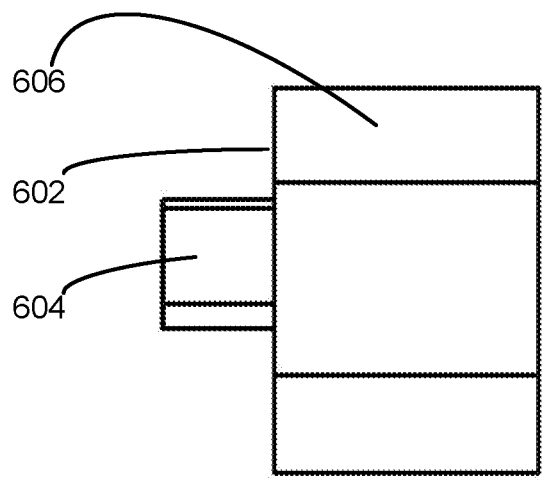
FIG. 6B illustrates a side view of a tool to screw or unscrew a tamper proof plug as shown in FIGS. 1A, 1B, and 1C.
Figure 6C:
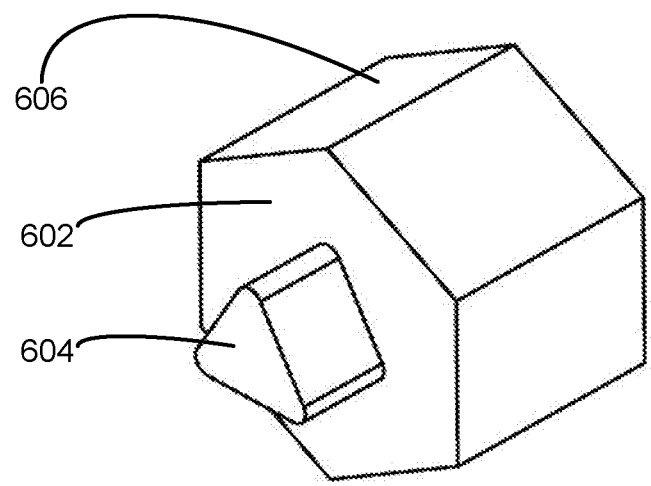
FIG. 6C illustrates a perspective view of a tool to screw or unscrew a tamper proof plug as shown in FIGS. 1A, 1B, and 1C.

FIG. 6A illustrates a top view of a tool to screw or unscrew a tamper proof plug as previously shown in FIGS. 1A, 1B, and 1C, in accordance with one embodiment of the invention. The tool to screw or unscrew a tamper proof plug has a face 602 which has a trianglar protrusion 604. FIG. 6B illustrates a side view of a tool to screw or unscrew a tamper proof plug, in accordance with one embodiment of the invention. The handle grip 606 is shown on the circumference of the tool. FIG. 6C illustrates a perspective view of a tool to screw or unscrew a tamper proof plug, in accordance with one embodiment of the invention. The tool has a face 602 and has the trianglar shaped protrusion 604 and has the hand grip 606 on the circumference of the tool.

As shown in FIGS. 1A, 1B, and 1C, and as shown in the corresponding FIGS. 6A, 6B, and 6C, each tamper proof plug having a distinctive shape of indentation, will have a corresponding special tool with a protrusion that matches the shape of the indentation of the tamper proof plug. In one embodiment, the tamper proof plug will screw inside a valve, such as a test cock of a backflow device to prevent water from being used. In one embodiment, it will sit inside the lip of the test cock, so it won't be easily visible or easily removed by other tools commonly available.

The exemplary embodiments described herein are for purposes of illustration and not intended to be limiting. Therefore, those skilled in the art will recognize that other embodiments could be practiced without departing from the scope and spirit of the claims set forth below.

What is claimed is:

1. A tamper proof plug and a corresponding tool comprising:
   a circular plug with a uniform width dimension of material having a flat first side and a flat second side, with a first plurality of outside threads to enable the circular plug to screw into a second plurality of inside threads of a valve outlet to control the flow of liquid, wherein the circular plug has a polygon indentation having a set depth dimension and a uniform cross-section perpendicular to the depth dimension in the middle of the flat first side of the circular plug, and
   a tool having a uniform cross-section protrusion that fits the size and shape of the polygon indentation, that allows a torque to be applied to the circular plug to screw the circular plug into a valve outlet or unscrew the circular plug from a valve outlet.

2. The tamper proof plug of claim 1 wherein the circular plug is fabricated from a material selected from the group of materials consisting of a metal, a metal alloy, a ceramic and a polymer.

3. The tamper proof plug of claim 1 wherein the polygon indentation having a depth dimension and a uniform cross-section perpendicular to the depth dimension is a shape selected from the group of shapes consisting of a triangle, a square, a pentagon, a hexagon, and a star.

4. The tamper proof plug of claim 1 wherein the circular plug is fabricated with the polygon indentation having a depth dimension and a uniform cross-section perpendicular to the depth dimension stamped into the circular plug.

5. The tamper proof plug of claim 1 wherein the circular plug is fabricated with the polygon indentation having a depth dimension and a uniform cross-section perpendicular to the depth dimension molded into the circular plug.

6. The tamper proof plug of claim 1 wherein the valve outlet is a cutout valve.

* * * * *